US006557511B2

(12) United States Patent
Rutschmann et al.

(10) Patent No.: US 6,557,511 B2
(45) Date of Patent: May 6, 2003

(54) SUCTION SYSTEM

(75) Inventors: Erwin Rutschmann, Tiefenbronn (DE); Armin Schweizer, Ditzingen (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/920,726

(22) Filed: Aug. 3, 2001

(65) Prior Publication Data

US 2002/0017262 A1 Feb. 14, 2002

(30) Foreign Application Priority Data

Aug. 4, 2000  (DE) .......................................... 100 38 011

(51) Int. Cl.[7] .............................................. F02M 35/10
(52) U.S. Cl. ........................ 123/184.53; 123/184.36; 123/184.49; 123/184.57; 123/184.51
(58) Field of Search ................... 123/184.53, 184.55, 123/184.56, 184.57, 184.59, 184.36, 184.49, 184.51

(56) References Cited

U.S. PATENT DOCUMENTS

| | | | | |
|---|---|---|---|---|
| 4,622,926 A | * | 11/1986 | Rutschmann et al. ... | 123/184.57 |
| 4,829,941 A | * | 5/1989 | Hitomi et al. ......... | 123/184.31 |
| 4,838,215 A | * | 6/1989 | Yasuda et al. ......... | 123/184.49 |
| 4,846,117 A | | 7/1989 | Hitomi et al. | |
| 5,031,598 A | * | 7/1991 | Ueda et al. ................ | 123/564 |
| 5,056,473 A | * | 10/1991 | Asaki et al. ........... | 123/184.31 |
| 6,192,850 B1 | | 2/2001 | Rutschmann et al. | |
| 6,250,272 B1 | * | 6/2001 | Rutschmann et al. .. | 123/184.57 |
| 6,418,900 B2 | * | 7/2002 | Itou ....................... | 123/184.59 |

FOREIGN PATENT DOCUMENTS

| | | |
|---|---|---|
| DE | 4116294 | 11/1991 |
| DE | 19814970 | 10/1999 |
| JP | 3-61613 | 3/1991 |

OTHER PUBLICATIONS

Search Report.

* cited by examiner

Primary Examiner—Henry C. Yuen
Assistant Examiner—Hai H Huynh
(74) Attorney, Agent, or Firm—Crowell & Moring LLP

(57) ABSTRACT

A suction system has an arrangement for utilizing resonance effects and is suitable for an internal-combustion engine having opposed cylinder banks. The suction system has a resonance container which has boundary walls. On the one hand, the resonance container is connected with the atmosphere and, on the other hand, it is connected with cylinders of the internal-combustion engine, the arrangement being provided in the resonance container as a control device which can vary the resonance cross-section, and the resonance container is connected with a feeding device having separate feeding pipes. For optimizing the torque behavior of the internal-combustion engine, the control device is fixed from the idling to a medium rotational speed range in a first end position and, together with the feeding pipes of the feeding device, forms two guiding channels which supply the cylinders the two cylinder banks with air.

20 Claims, 2 Drawing Sheets

SUCTION SYSTEM

BACKGROUND AND SUMMARY OF THE INVENTION

This application claims the priority of German Patent Document 100 38 011.5, filed Aug. 4, 2000, the disclosure of which is expressly incorporated by reference herein.

The invention relates to a suction system having an arrangement for utilizing resonance effects for an internal-combustion engine with opposed cylinder banks. Preferred embodiments of the invention relate to a suction system having an arrangement for utilizing resonance effects for an internal-combustion engine having opposed cylinder banks, which suction system comprises a resonance container which has boundary walls and which, on the one hand, is connected with the atmosphere and, on the other hand, is connected with cylinders of the internal-combustion engine, the arrangement being provided in the resonance container as a control device which can vary the resonance cross-section, and the resonance container is connected with a feeding device having separate feeding pipes.

A suction system is known from U.S. Pat. No. 4,846,117 which has a container in which a ring duct is provided. By way of this ring duct, opposed cylinder banks are supplied with intake air. The container is connected to a feeding device provided with an air filter.

German Patent Document DE 198 14 970 (corresponding U.S. Pat. No. 6,192,850) relates to a suction system for an internal-combustion engine having an arrangement for utilizing resonance effects. This suction system has a resonance container in which a control device operates which can influence the resonance cross-section of the resonance container. The resonance container is connected with two separate feed pipes of a feeding device.

It is an object of the invention to take such measures on a suction system with an arrangement for utilizing resonance effects that the torque behavior of the internal-combustion engine is improved over a wide rotational-speed range, that is, also to a medium rotational speed range.

According to the invention, this object is achieved by providing such a suction system, wherein the control device is fixed from the idling to a medium rotational speed range in a first end position and, together with the feeding pipes of the feeding device, forms two guiding channels which supply the cylinders of the two cylinder banks with air, and in that, between the feeding pipes of the feeding device, at least one pressure transition point is operative, the control device being operable above the medium rotational speed range from the first end position to a second end position for influencing the resonance cross-section. Additional features of preferred embodiments of the invention are described herein and in the claims.

Principal advantages achieved by the invention are that, as a result of the control device, by which the resonance cross-section in the resonance container can be varied, and the pressure transition point, also called cross-talk point, in the feeding device, the torque quality of the internal-combustion engine equipped with this suction system is also or specifically excellent to a medium rotational speed range. The control device as well as the pressure transition point can be implemented by using constructively clear measures. The closing element and the sealing section can be provided in a simple manner on the control device and the suction system respectively. Finally, the switchable cross-talk points can be integrated in a constructionally clear and easy manner in the feeding device.

Other objects, advantages and novel features of the present invention will become apparent from the following detailed description of the invention when considered in conjunction with the accompanying drawings.

DETAILED DESCRIPTION OF THE DRAWINGS

Figure 1:
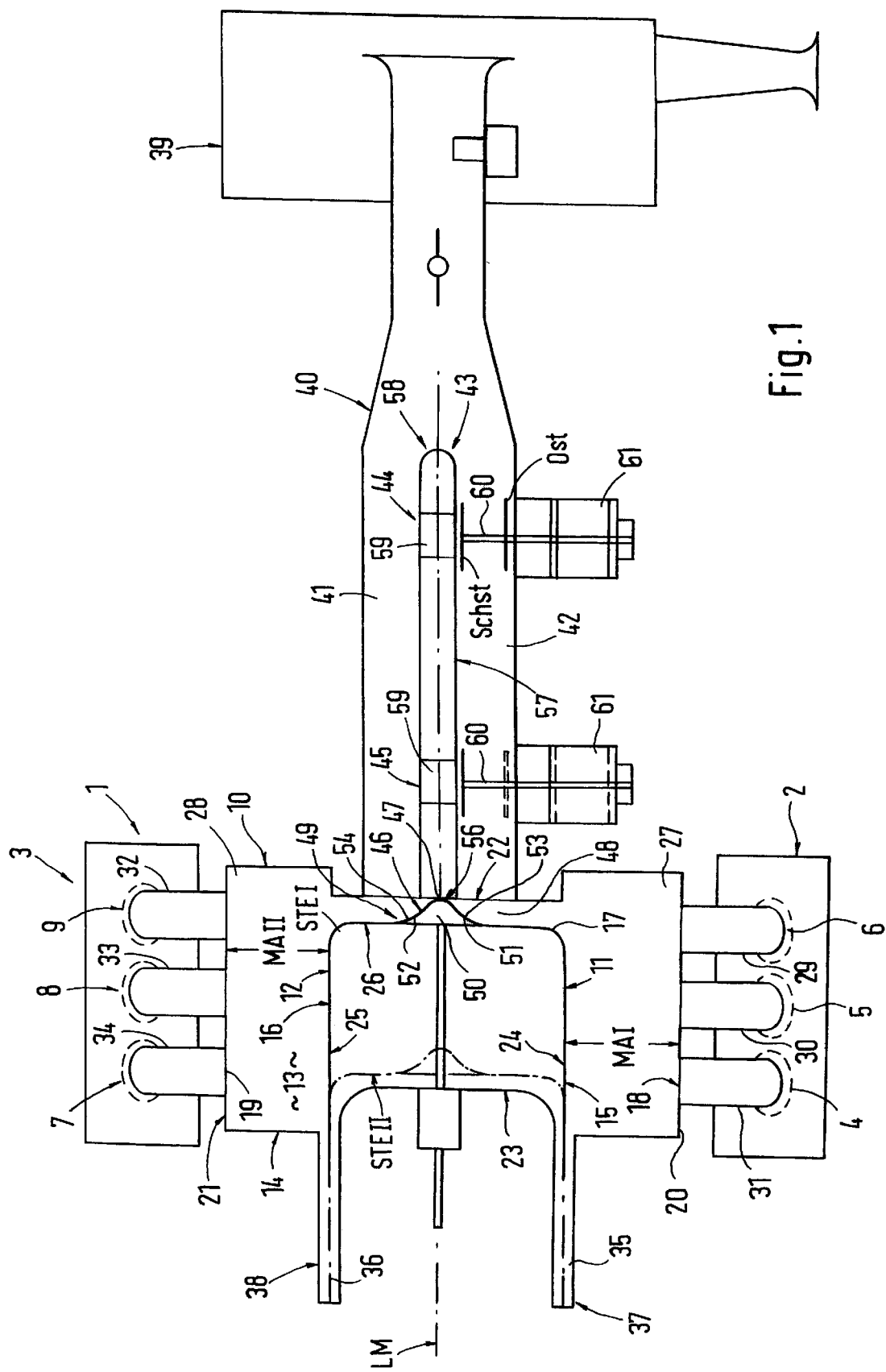
FIG. 1 is a schematic representation of an internal-combustion engine with a suction system according to the invention.

An internal-combustion engine 1 comprises opposed cylinder banks 2, 3 which are arranged with respect to one another in a horizontally opposed or V-shape, specifically at a distance with respect to a longitudinal center plane LM of this engine. In the embodiment shown, each cylinder bank 2, 3 has three cylinders 4, 5, 6 and 7, 8, 9 respectively. Between the cylinder banks 2, 3, a suction system 10 is provided which supplies the cylinders 4, 5, 6 and 7, 8, 9 with air.

The suction system 10 is equipped with an arrangement 11 for utilizing resonance effects, as achieved by means of Helmholtz resonators, Bosch, Automotive Handbook, 22nd Edition, 1995, Page 379.

The arrangement 11 comprises a control device 12 which is arranged in the interior 13 of a resonance container 14 of the suction system 10 consisting of metal, plastic, or the like. By means of the control device 12, the resonance cross-section in the resonance container 14 can be varied, whereby a defined optimization of the torque of the internal-combustion engine 1 can be implemented.

The control device 12, which, with respect to the material, has a similar construction as the resonance container 14, has conducting walls 15, 16, 17. The conducting walls 15, 16 extend at a distance (MA I, MA II) from the walls 18, 19 of the resonance container 14. The resonance container 14 has a prism-type basic shape, its walls 18, 19 being constructed as longitudinal walls 20, 21 facing the cylinder banks 2 and 3. Transversely extending first and second end walls 22, 23 extend to the longitudinal walls 20, 21. The conducting walls 15, 16 are aligned parallel to the longitudinal walls 20, 21 and end walls 22, 23 respectively. The conducting walls 15, 16, 17 are arranged in a U-shape with respect to one another, and their side walls have the reference numbers 24 and 25; their web wall has the reference number 26.

The control device 12 is constructed in a continuously adjustable manner between a first end position STE I and a second end position STE II. In the first end position STE I, one resonance volume 27 and 28 respectively is formed per cylinder bank 2 and 3, which resonance volumes 27 and 28 are situated in front of the above-mentioned cylinder banks. On the sides facing the cylinder banks 2 and 3, the resonance container 14 has pipe sections 29, 30, 31 and 32, 33, 34 which lead to the cylinders 4, 5, 6 and 7, 8, 9. The above-mentioned, relatively short pipe sections are components of the resonance container 14.

The side walls 24, 25 of the control device 12 are surrounded by receiving devices 35, 36 of the resonance container 14. These receiving devices 35, 36 are extensions 37, 38 of the resonance container 14 and have a tube-shaped cross-section.

The first end wall 22 of the resonance container 14 is equipped with a feeding device 40 which comprises an air filter 39 and has separate feeding pipes 41 and 42. Between the feeding pipes 41, 42, pressure transition points 43, 44 and 45 are provided which, in the field of acoustics, are also called cross-talk points.

Figure 2:
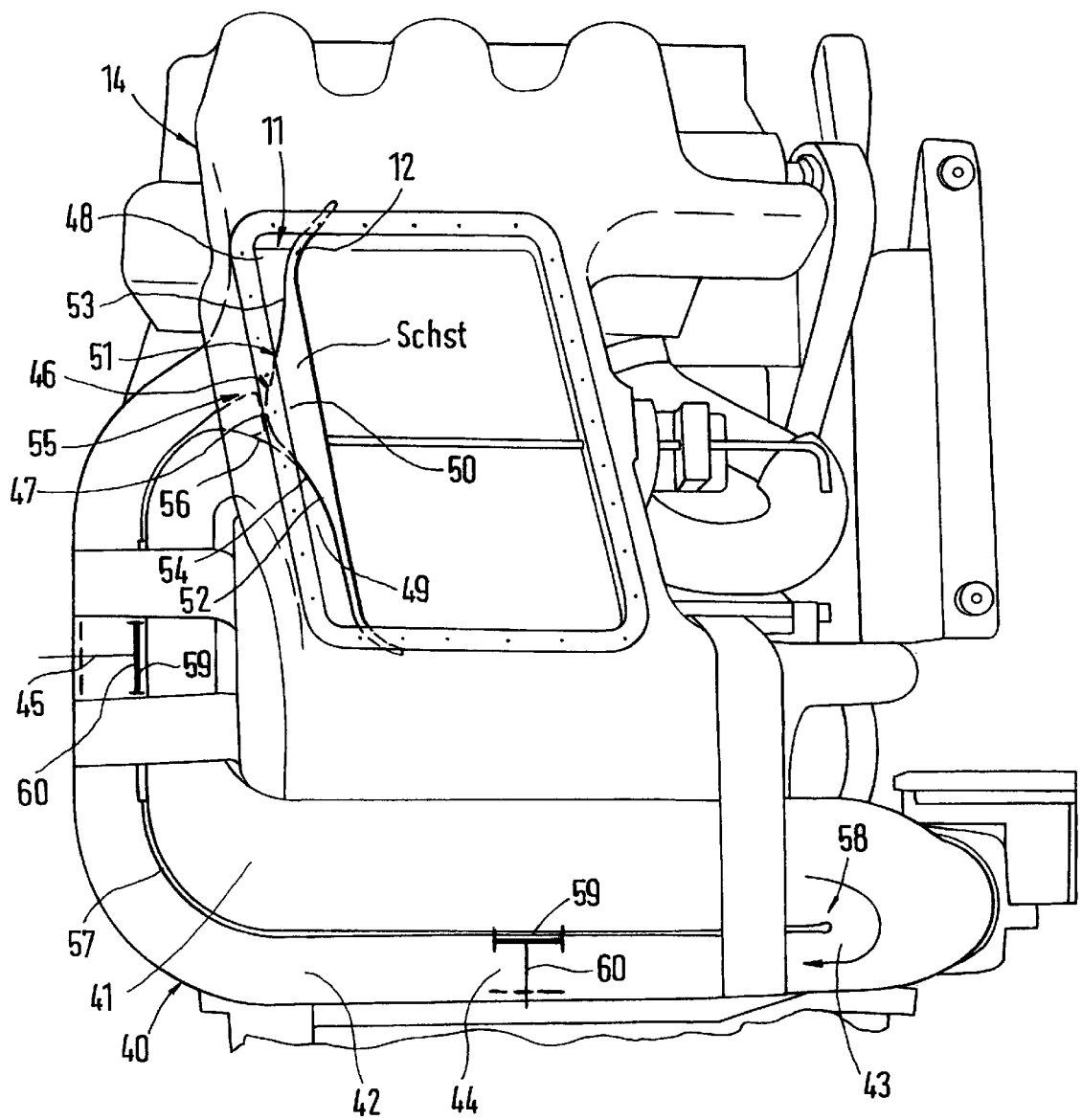
FIG. 2 is a diagonal top view of the internal-combustion engine of FIG. 1 with the implemented suction system.

On the web wall 26 of the control device 12, a closing element 46 is mounted in the longitudinal center plane ML, which closing element 46 interacts in a first end position STE I with a sealing section 47 of the feeding device 40. This results in separate guiding channels 48, 49 for the cylinders 4, 5, 6 and 7, 8, 9 respectively in the end position STE I with the feeding pipes 41 and 42. The closing element 46 is formed by a local widening 50 of the web wall 26, the web wall 26 and the adjoining side walls 24, 25, in areas as a result of shapings 51, 52, forming wall sections 53, 54 of the guiding channels 48, 49. The sealing section 47 is provided at a local thickening 55—FIG. 2—which is arranged at the end 56 of a separating wall 57 facing the widening 50 between the feeding pipes 41, 42 of the feeding device 40.

The pressure transition points 43, 44, 45 have different configurations: Thus, they are constructed as a fixed pressure transition point 43 and as a first switchable and as a second switchable pressure transition point 44, 45. The number of pressure transition points can be defined by computer and/or iteratively. The fixed pressure transition point 43 is placed at the end 58 situated away from the end 56 of the separating wall 57. Between the two ends 56 and 58, the first switchable pressure transition point 44 and the second pressure transition point 45 are installed distributed along the length of the feeding device 40. Each switchable pressure transition point, for example, 44, has a passage opening 58 in the separating wall 57 and a closing element 59. The closing element 60 is operated, for example, by means of a device represented as a vacuum adjuster 61, specifically between a closed position Schst and an open position Ost. However, other actuators, among others, of an electrical construction are also conceivable.

During the operation of the internal-combustion engine 1, the control device 12 takes up the end position STE I during the idling. The closing element 46 is supported on the sealing section 47 and the switchable pressure transition points 44, 45 are closed. Under full-load conditions of the internal-combustion engine, the fixed pressure transition point 43 is operative to a first lower medium rotational speed range, for example, 2,000 r.p.m. Starting from an approximately second, higher medium rotational speed range, for example, 2,500 r.p.m., the first switchable pressure transition point 45 will open up, and starting from a third increased medium rotational speed range of 3,500 r.p.m, the second switchable pressure transition point 45 will open up. After the last-mentioned rotational speed range, the control device 12, which is moved from the end position STE I in the direction STE II, becomes active, and the resonance cross-section in the resonance container 14 is varied.

However, it is also contemplated as a function of the internal-combustion engine 1, to switch, from the idling to the increased medium rotational speed range—3,500 r.p.m, the first switchable transition point 44 and the second transition point 45 alternately, that is, according to the existing pressure conditions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Suction system having an arrangement for utilizing resonance effects for an internal-combustion engine having opposed cylinder banks, which suction system comprises a resonance container which has boundary walls and which, on the one hand, is connected with the atmosphere and, on the other hand, is connected with cylinders of the internal-combustion engine, the arrangement being provided in the resonance container as a control device which can vary the resonance cross-section, and the resonance container is connected with a feeding device having separate feeding pipes, wherein the control device is fixed from an idling to a medium rotational speed range in a first end position and, together with the feeding pipes of the feeding device, forms two guiding channels which supply the cylinders of the two cylinder banks with air, and wherein at least one pressure transition point is operative between the feeding pipes of the feeding device, the control device being operable above a medium rotational speed range from the first end position to a second end position for influencing the resonance cross-section.

2. Suction system according to claim 1,
wherein the control device has a closing element which cooperates with a sealing section of the feeding device.

3. Suction system according to claim 2,
wherein the closing element is mounted on a web wall of the control device.

4. Suction system according to claim 3,
wherein the closing element is formed by a local widening of the web wall of the control device.

5. Suction system according to claim 4,
wherein the web wall is connected with side walls, the web wall and the side walls forming wall sections of the guiding channels at least in areas.

6. Suction system according to claim 4,
wherein the sealing section is provided on a local thickening (55) between the feeding pipes of the feeding device.

7. Suction system according to claim 3,
wherein the web wall is connected with side walls, the web wall and the side walls forming wall sections of the guiding channels at least in areas.

8. Suction system according to claim 7, wherein the sealing section is provided on a local thickening (55) between the feeding pipes of the feeding device.

9. Suction system according to claim 3,
wherein the sealing section is provided on a local thickening (55) between the feeding pipes of the feeding device.

10. Suction system according to claim 2, wherein the sealing section is provided on a local thickening (55) between the feeding pipes of the feeding device.

11. Suction system according to claim 1,
wherein switchable pressure transition points are provided in the feeding device.

12. Suction system according to claim 11,
wherein each switchable pressure transition point has a passage opening in a separating wall between the feeding pipes of the feeding device, which passage opening interacts with a closing element.

13. Suction system according to claim 12,
wherein the closing element can be moved by means of a device into a closed position and an open position.

14. Suction system according to claim 12,
wherein three pressure transition points are provided along the length of the feeding device in a distributed manner, one of the pressure transition points acting as a fixed pressure transition point and two being constructed as a first switchable pressure transition point and as a second pressure transition point.

15. Suction system according to claim 14,
wherein the closing element can be moved by means of a device into a closed position and an open position.

16. Suction system according to claim 1,
wherein three pressure transition points are provided along the length of the feeding device in a distributed manner, one of the pressure transition points acting as a fixed pressure transition point and two being constructed as a first switchable pressure transition point and as a second pressure transition point.

17. Suction system according to claim 14,
wherein the pressure transition points are operative as a function of the rotational speed of the internal-combustion engine such that, in a first lower medium rotational speed range, the fixed transition point is operative, in a second higher medium rotational speed range, the first switchable pressure transition point is operative and, in a third increased medium rotational speed range, the second switchable pressure transition point is operative.

18. Suction according to claim 14,
wherein the first and the second switchable transition points are alternately switched to a medium rotational speed range of the internal-combustion engine.

19. An internal combustion engine including two opposed cylinder banks which each include a plurality of engine cylinders, and an air intake system for supplying air to said cylinders,
said air intake system comprising:
a resonance container with boundary walls, said resonance container being interposed in use between air feeding pipes of an air feeding device and the engine cylinders, and
a control device operable to vary a resonance cross-section of the resonance container,
wherein the control device is fixed from an idling to a medium rotational speed range in a first end position and, together with the feeding pipes of the feeding device, forms two guiding channels which supply the cylinders of the two cylinder banks with air, and
wherein at least one pressure transition point is operative between the feeding pipes of the feeding device, the control device being operable above a medium rotational speed range from the first end position to a second end position for influencing the resonance cross-section.

20. A method of operating an internal combustion engine of the type including two opposed cylinder banks which each include a plurality of engine cylinders, and an air intake system for supplying air to said cylinders,
said air intake system comprising:
a resonance container with boundary walls, said resonance container being interposed in use between air feeding pipes of an air feeding device and the engine cylinders, and
a control device operable to vary a resonance cross-section of the resonance container,
wherein the control device is fixed from an idling to a medium rotational speed range in a first end position and, together with the feeding pipes of the feeding device, forms two guiding channels which supply the cylinders of the two cylinder banks with air, and
wherein at least one pressure transition point is operative between the feeding pipes of the feeding device, the control device being operable above a medium rotational speed range from the first end position to a second end position for influencing the resonance cross-section.

\* \* \* \* \*